United States Patent [19]

Henriksson

[11] Patent Number: 5,426,679

[45] Date of Patent: Jun. 20, 1995

[54] STRAINER DEVICE FOR FILTERING WATER TO AN EMERGENCY COOLING SYSTEM IN A NUCLEAR POWER PLANT

[75] Inventor: Mats Henriksson, Alvkarleby, Sweden

[73] Assignee: Vattenfall Utveckling AB, Alvkarleby, Sweden

[21] Appl. No.: 273,977

[22] Filed: Jul. 12, 1994

[30] Foreign Application Priority Data

Apr. 20, 1994 [SE] Sweden .................. 9401330

[51] Int. Cl.⁶ ............................ G21C 19/307
[52] U.S. Cl. .................... 376/313; 210/98; 210/106; 210/460
[58] Field of Search ............ 376/313, 310, 277; 210/98, 106, 409, 460

[56] References Cited

U.S. PATENT DOCUMENTS 4,155,850 5/1979 Rathbone et al. ............ 210/98

*Primary Examiner*—Daniel D. Wasil
*Attorney, Agent, or Firm*—James C. Simmons

[57] ABSTRACT

A strainer device for filtering water to an emergency cooling system in a nuclear power plant containment area having a lower part which forms a pool in which the strainer device is mounted. The device includes a strainer housing with separate strainer walls between which a flexible strainer means operates. The unit is arranged to be kept in a first position when water is drawn through one of the strainer walls, in which position it interrupts the connection between the other strainer wall and a suction conduit. By inherent flexibility, a shield means is automatically switched over to a second position which opens the connection between the second strainer wall and the suction conduit, as soon as the first strainer wall is clogged by impurities to such an extent that a low-pressure arises in the space between the first strainer wall and the shield means unit, which low-pressure brings about the switching-over by its suction effect.

6 Claims, 3 Drawing Sheets

STRAINER DEVICE FOR FILTERING WATER TO AN EMERGENCY COOLING SYSTEM IN A NUCLEAR POWER PLANT

TECHNICAL FIELD OF THE INVENTION

This invention relates to a strainer device for filtering water to an emergency cooling system in a nuclear power plant of the type comprising a reactor arranged in a containment whose bottom part forms a pool for water, the strainer device being placed in the pool and serving to filter water which, if required, is taken from the pool and supplied to nozzles in the emergency cooling system in order to cool the reactor core in the event of an inadmissible temperature rise therein, the strainer comprising at least one housing with one or several apertured strainer walls through which the water can be sucked from the outside and into the housing and thereafter be fed to the emergency cooling system via a tube conduit connected to the housing.

BACKGROUND OF THE INVENTION

Strainer devices of the above related sort can be divided into two main types, to wit a first type being equipped with means for back-flushing of the strainer housing, and a second type which completely lacks such means. The first mentioned strainer devices are advantageous from a safety point of view, as long as they permit a cleaning of the apertured strainer walls of the housing at locations where these walls would unintentionally be clogged or blocked by fibres or other impurities circulating in the containment. This is effected by feeding clean wash-water into the strainer housing through a special feeding conduit with a pumping unit being connected thereto, the latter being actuable when necessary.

However, an important inconvenience of such strainer arrangements is that the pumping unit as well as the special wash-water conduit are costly to produce and install. Moreover, they require considerable space in the area outside the strainer housing. It is true that the other type of strainer arrangements, i.e., those which completely lack back-flushing means, are comparatively inexpensive and space-saving, but they are limited in regard to the safety aspect, since they stop functioning if the holes in the strainer walls become clogged.

In case fibres cumulate on the outside of the apertured envelope surface on a strainer housing, the fibres will form a continuous, circumferential mat. With previously known strainer arrangements, considerable difficulties have been encountered when detaching this fibre mat in connection with a backflushing. The wash-water which is brought to flow from the inside in a direction radially outwards through the perforations in the strainer wall, does not bring about any complete and immediate release of the fibre mat; initially the water flow merely stretches the mat during simultaneous breaking up of the fibre structure. The removal of the mat is thus accomplished in such a way that individual fibres are successively released and removed from the mat. It is only after considerable hydromechanical action that the mat starts getting weaker and is gradually divided into chunks that leave the strainer wall. In order to cope with these difficulties, it has recently been suggested to provide radially protruding wings on the outside of the strainer wall, which wings split a cumulated fibre mat into several, peripherally separate sections, each one of which easily detaches from the strainer wall in connection with a backflushing. This is disclosed in PCT/SE93/01042.

According to preferred embodiments of the present invention, radially protruding wings of the above mentioned type are foreseen, which are thus known per se.

SUMMARY OF THE INVENTION

The present invention aims at obviating the above-mentioned inconveniences of prior-art strainer devices and providing a simple and inexpensive strainer device with strainer walls which are always kept clean without any necessity of back-flushing.

Thus, a main object of the invention is to provide a strainer device with at least two separate strainer walls or strainer wall surfaces of which one is always automatically kept clean in order to reliably make possible a feeding of water from the water pool to an emergency cooling system as soon as the necessity arises.

A further object of the present invention is to provide a strainer device having means for keeping the holes of the strainer walls clean or open, which means are arranged so as to be capable of being built in the strainer housing itself, while avoiding any form of space-demanding connection components in the area outside the strainer housing.

Yet another object of the present invention is to provide a strainer device for filtering water to an emergency cooling system in a nuclear power plant of the type having a reactor arranged in a containment zone and wherein the containment zone has the portion adapted to form a water pool, and wherein the system includes a strainer device adapted to be placed in the pool of water and functioning to filter water, and wherein the strainer includes at least one housing with at least one apertured strainered wall through which water can be drawn from the outside through the apertures into the housing, and wherein water may be fed to an emergency cooling system via at least one conduit connected to the housing, the improvement comprising flexible shield means mounted between separate strainer walls or strainer wall surfaces, said shield means being positioned in a first position or condition when water is drawn through one of said separate strainer walls or surfaces in which first position said shield means is operable to interrupt a fluid connection with the other strainer wall and said conduit, said shield means being capable of assuming a second position in which there is provided an open connection between said second strainer wall and said conduit when said first strainer wall is blocked by impurities sufficient to create a low-pressure zone between the first strainer wall and said shield means, said low-pressure zone being effective to effect said shield means between said first and second positions.

In case fibres cumulate on the outside of the apertured envelope surface on a strainer housing, the fibres will form a continuous, circumferential mat. With previously known strainer arrangements, considerable difficulties have been encountered when detaching this fibre mat in connection with a backflushing. The wash-water which is brought to flow from the inside in a direction radially outwards through the perforations in the strainer wall, does not bring about any complete and immediate release of the fibre mat; initially the water flow merely stretches the mat during simultaneous breaking up of the fibre structure. The removal of the mat is thus accomplished in such a way that individual fibres are successively released and removed from the mat. It is only after considerable hydromechanical action that the mat starts getting weaker and is gradually divided into chunks that leave the strainer wall. In order to cope with these difficulties, it has recently been suggested to provide radially protruding wings on the outside of the strainer wall, which wings split a cumulated fibre mat into several, peripherally separate sections, each one of which easily detaches from the strainer wall in connection with a backflushing. This is disclosed in PCT/SE93/01042.

According to preferred embodiments of the present invention, radially protruding wings of the above mentioned type are foreseen, which are thus known per se.

DETAILED DESCRIPTION OF THE PREFERRED EMBODIMENT

Figure 1:
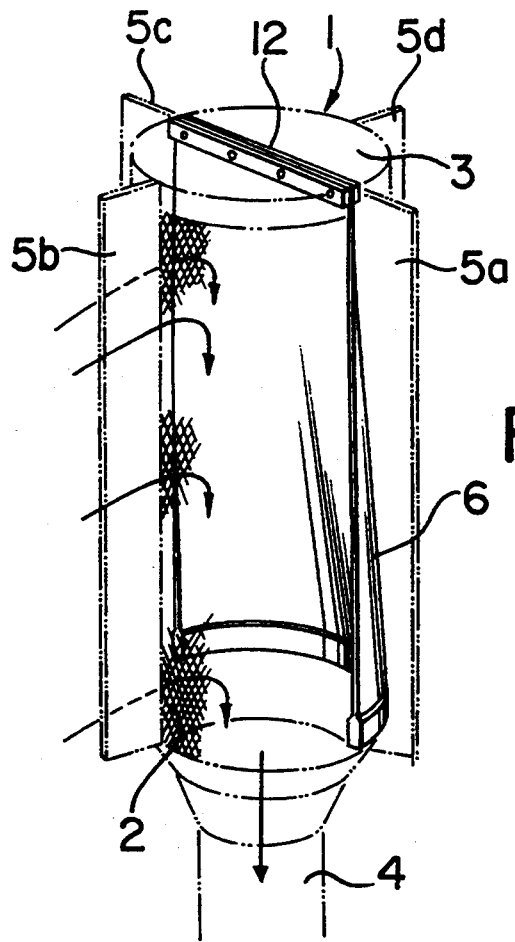
FIG. 1 is a partial sectional perspective view showing the inside of a strainer device which in this case comprises one single simple housing.

In FIG. 1, a strainer housing of basically cylindrical form is generally designated by reference numeral 1 and comprises a tube-formed strainer wall 2 which has a multitude of small holes or apertures, e.g. in the shape of perforated holes in a sheet-metal. At one of its ends, in this case the upper one, the strainer housing is closed by a gable plate or wall 3. At the opposite end, the strainer housing is connected to a tube-formed suction conduit 4 which in its turn is connected to a suction pump (not shown). The latter is normally located outside the reactor containment, and water can be sucked in from a pool of water through strainer wall 2, and then be fed to the emergency cooling system. On the outside of strainer wall 2 are provided a number of wings, in this case four equidistantly separated wings 5a, 5b, 5c and 5d. As may be clearly seen in FIG. 1, these wings 5 extend the whole way along the axial length of strainer wall 2.

Figure 2:
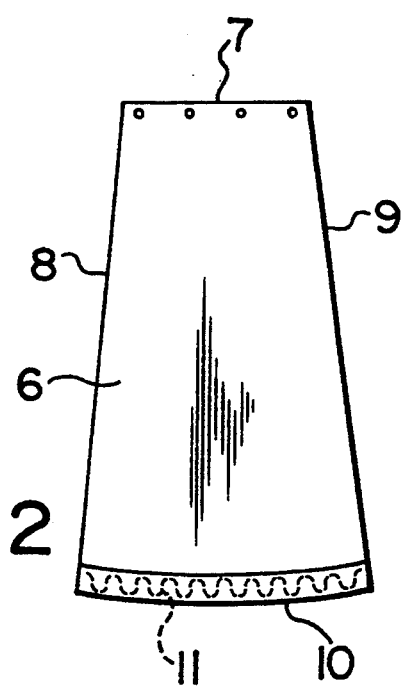
FIG. 2 is a side view of a flexible shield means unit in untightened condition.
Figure 3:
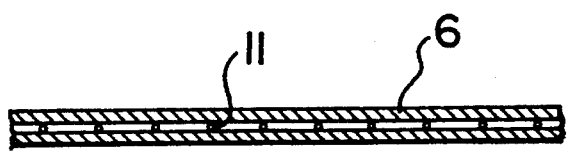
FIG. 3 is an enlarged, partial length section through the shield means unit according to FIG. 2 in the area of a mechanical spring forming part thereof.

According to the present invention a supple or flexible shield means unit is provided within strainer housing 1, the shield means unit being generally designated by reference numeral 6. It is shown in an unfolded or untightened condition in FIG. 2.

In practice, the shield means unit 6 may advantageously be made of a piece of rubber or plastic of suitable stiffness and thickness (for instance 3 to 6 mm). As may be seen in FIG. 2, shield means unit 6 has four (in the present case) distinctly separate edges, viz. a first edge 7, second and third edges 8,9 and a fourth edge 10.

In the shown example, the shield means unit is slightly sector-shaped in its unfolded, untightened state, since the two longitudinal edges 8,9 diverge from each other, long side edge 10 attains a longer length than opposite short side edge 7. More precisely, long side edge 10 has substantially the same length as half the circumference of the cylindrical strainer wall 2 of strainer housing 1, while the length of short side edge 7 substantially corresponds to the diameter of cylinder tube 2. In the area of the longer curved side edge 10, a mechanical spring 11 is inserted into the rubber or plastic cloth, the spring being flexible in a direction across the plane of the cloth. Spring 11 may be in different forms. However, a spring with the shape of wave or sinusoidal-formed spring wire is preferred, which is capable of being shortened in connection with bending across the plane of the spring and the cloth.

When the thus formed rubber cloth 6, which serves as a shield means unit, is mounted within strainer housing 1, three of the four edges of the cloth are tightened, viz. edges 7, 8, 9, while the fourth edge 10 remains freely movable. The tightening of edges 7, 8, 9 is schematically illustrated in FIG. 1 using two clamping strips 12 which are located on the lower side of gable plate 3, thus clamping short side edge 7. Corresponding clamping strips also clamp longitudinal side edges 8, 9, although this is not shown in FIG. 1, for the sake of clarity. In practice, the three fastened edges 7, 8, 9 may also be fastened in another way, e.g., between flanges on two semi-cylindrical housing halves together forming a cylindrical housing when joined and mounted. It will be evident that the fourth, free edge 10 of the rubber cloth may be bent between two opposition adjustment positions in which the edge in question abuts against the inside of strainer wall 2.

Figure 4:
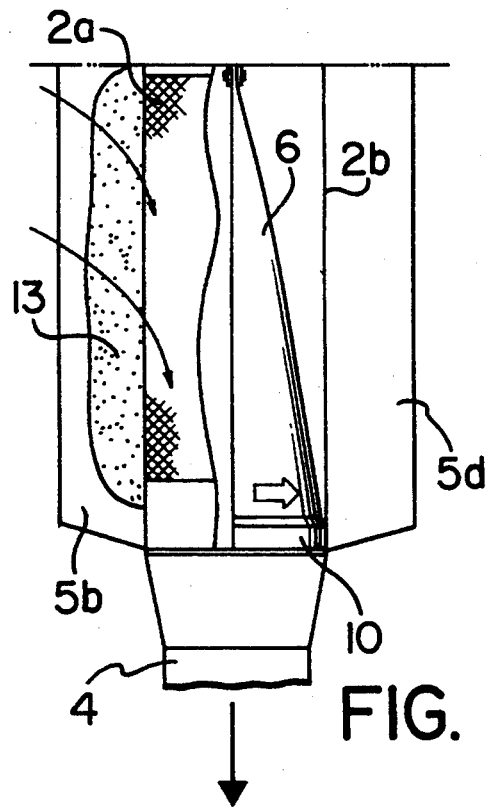
FIG. 4 is a vertical section through the strainer housing according to FIG. 1, with the shield means unit in a first state of function.
Figure 6:
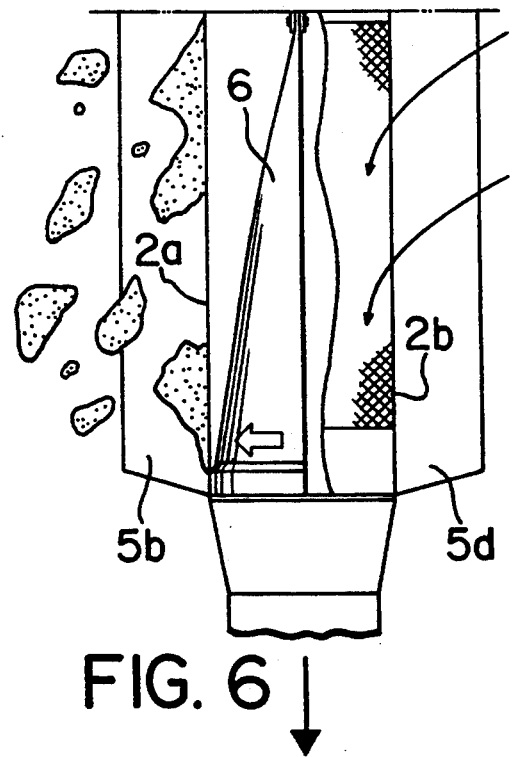
FIG. 6 is a vertical section corresponding to FIG. 4, showing the shield means unit in a second state of function.
Figure 5:
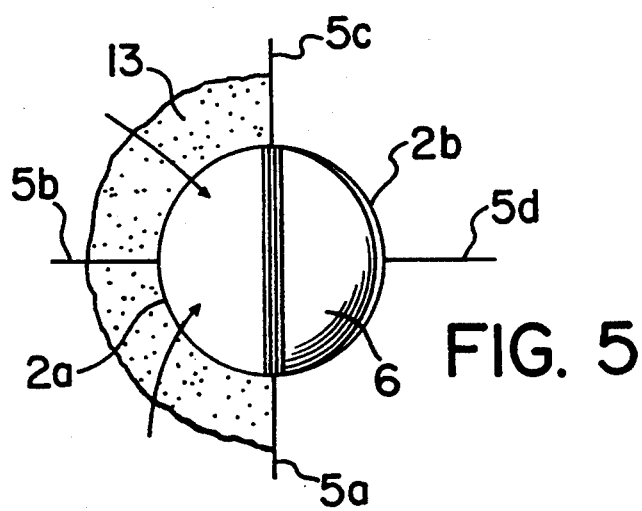
FIG. 5 is a horizontal section through the strainer housing, with the shield means unit in the first state of function, as in FIG. 4.

Reference is now made to FIGS. 4 through 6 which illustrate the function of the invention. FIG. 5 shows how the upper edge 7 of rubber cloth 6 extends between wings 5a and 5c which are located on the outside of the strainer housing. Thus, longitudinal side edges 8,9 extend parallel to each other, immediately adjacent to the inner edges of wings 5a,5c. In this way, strainer wall 2 is divided into two separate, first and second part surfaces which are designated 2a and 2b, respectively. In FIGS. 4 and 5 rubber cloth 6 is shown as being adjusted in a first position or condition in which the free edges 10 is held in abutment or engagement against the inside of part surface 2b by spring 11, more particularly in the area of the lower edge of the part surface. In this condition, rubber cloth 6 interrupts the contact between strainer wall surface 2b and suction conduit 4. Therefore, when water is sucked into conduit 4 via strainer housing 1, it is accomplished solely via the first strainer wall surface 2a, as illustrated by the arrows in FIG. 4.

As water is sucked through the strainer housing, fibres may build up on the outside of strainer wall surface 2a and form a semicircular mat, as shown in FIG. 5. When this mat has "grown" sufficiently thick, it will exert such a large resistance against the suction of water that an area of low-pressure will arise in the space between strainer wall surface 2a and rubber cloth 6 (i.e., a pressure lower than the surrounding water pressure). At a sufficiently low-pressure in said space, this suction effect becomes so strong that spring 11 will no longer be able to retain its initial position. This means that the spring will revert, over its own inherent spring action, to a diametrically opposite position, as shown in FIG. 6, i.e., into a second working position in which the lower edge of the cloth abuts against the inside of the first strainer wall surface 2a while interrupting the communication between this strainer wall surface and suction conduit 4. This means that the connection between strainer wall surface 2b and suction conduit 4 is opened so that water can be sucked or drawn in via strainer wall surface 2b. When the spring and the rubber cloth converts over from the first to the second working position, the previous suction flow in the space inside strainer wall 2a ceases, whereby the fibre mat on the outside expands and detaches from the wall. Moreover, a light pressure pulse arises in said space, contributing to the removal of the mat, as indicated to the left in FIG. 6. This removal is further enhanced by the fact that wing 5b divides the curved mat 13 into two quarter-circular halves.

When a sufficiently thick fibre mat is also built up on strainer wall surface 2b, the above described phenomenon is repeated, but in the opposition direction.

The advantages of the invention will thus be evident. Independently of which of its two opposite working positions the rubber cloth occupies, one of the two part surfaces 2a,2b of the strainer wall is always kept open for the suction of water. Furthermore, the rubber cloth or shield means unit, which in practice functions as switch-over valve, also contributes to an automatic removal of a fibre mat by giving rise to at least a light pressure gust in the space inside the part surface being covered by fibres, in connection with the switching-over from one working position to the other. Besides, the valve function obtained by the rubber cloth works automatically, i.e., without any outer control, in that the cloth is bent from one position to the other as soon as a sufficiently thick fibre mat has built-up on the outside of the strainer wall surface in question. It should also be pointed out that the simple and inexpensive rubber cloth is included into the strainer housing in its entirety, implying that external washwater conduits and pumps (together with the required control equipment) may be entirely eliminated.

Figure 7:
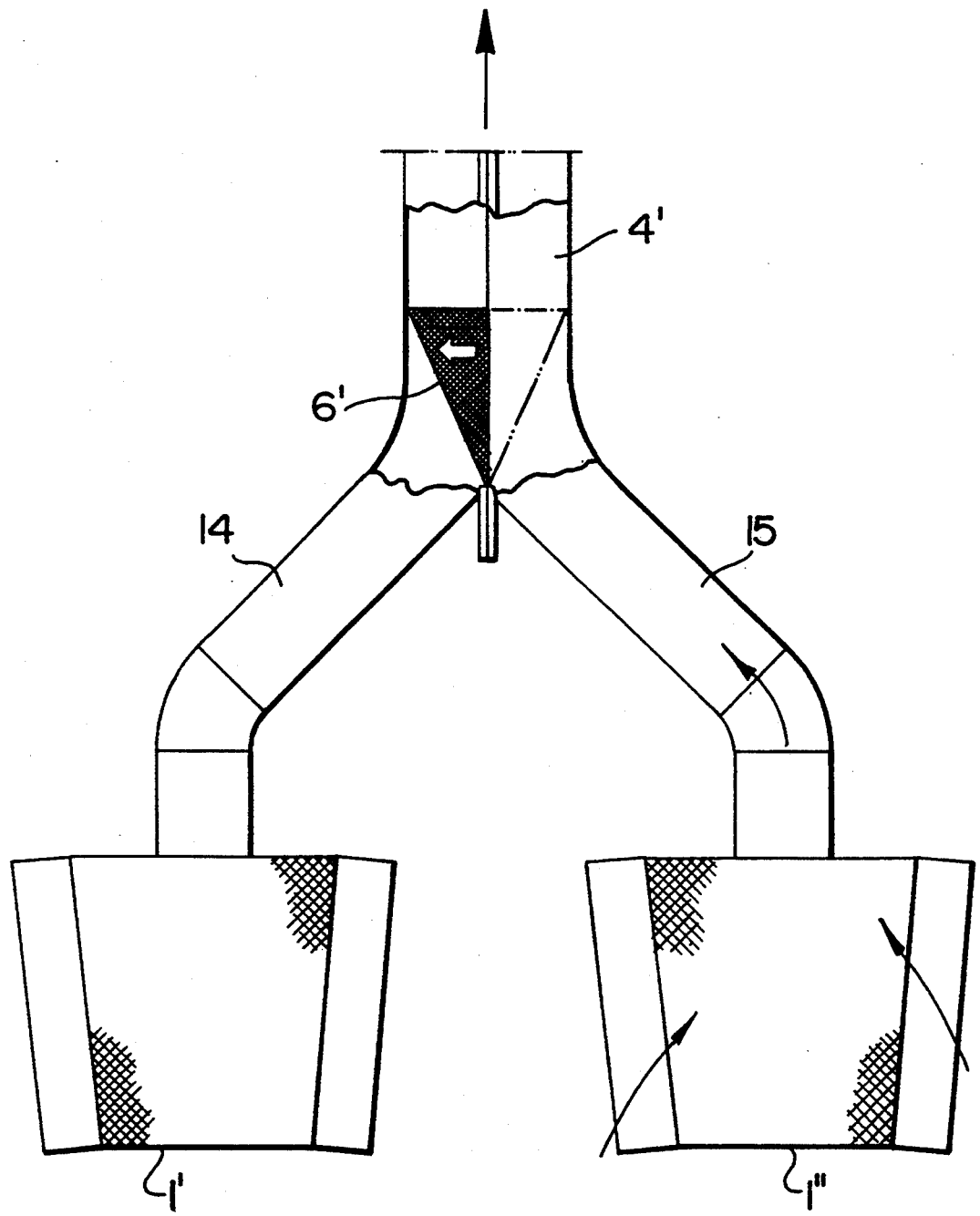
FIG. 7 is a schematic, partial sectional side view showing an alternative embodiment of a device according to the invention comprising two separate strainer housings.

In FIG. 7, an alternative embodiment is shown, according to which the strainer device comprises two separate strainer housings 1′ and 1″ respectively, which are connected to a common suction conduit 4′ via branch conduits 14,15. In this case, a rubber cloth or another flexible shield means unit 6′ is mounted adjacent to the fork point between the main suction conduit 4′ and the branch conduits 14,15. In the working position shown in FIG. 1, rubber cloth 6′ interrupts the connection between strainer housing 1′ and suction conduit 4′, at the same time as the connection between strainer housing 1″ and conduit 4′ is kept open. In this condition, the suction of water takes place via strainer housing 1″, while strainer housing 1′ is inactive. However, as soon as a fibre mat of sufficient thickness has built-up on the outside of strainer housing 1″, a low pressure area eventually results in a switch-over of rubber cloth 6′ to the working position indicated by the dash-dotted lines, at which point the connection between strainer housing 1′ and suction conduit 4′ is opened. At the switching-over of rubber cloth 6′ a light pressure pulse is also created in branch conduit 15, this pressure pulse being sufficient to blow away the fibre mat on the outside of strainer housing 1″. Similarly, to part surfaces 2a,2b in the arrangement according to FIG. 1, the two strainer housing 1′ and 1″ will also work alternately between the two working positions.

Alternate Emdodiments of the Invention

It is evident that the invention is not restricted solely to the specific embodiments described above and shown in the drawings. Thus, other means than just a rubber cloth may be used for forming the flexible shield means unit. Thus, it is feasible to use thin, plied sheetings or other plates of a flexible nature. Further, the geometrical form of the shield means unit may vary within wide limits. Thus, the two longitudinal edges of the shield means unit may transpose into a third, clampable portion or into each other via rounded material portions instead of via sharp corners, as exemplified in the drawings. It should further be pointed out that the supple edge portion with the spring does not necessarily have to be in tight abutment against the inside of the strainer wall. Thus, a certain leakage flow between this edge portion and the strainer wall is acceptable. It should also be pointed out that the shield means unit may be mounted into housings or tubes with another cross-sectional form other than circular, e.g., oval or polygonal.

I claim:

1. In a strainer device for filtering water to an emergency cooling system in a nuclear power plant of the type having a reactor arranged in a containment zone and wherein the containment zone has a portion adapted to form a water pool, and wherein the system includes a strainer device adapted to be placed in the pool of water and functioning to filter water, and wherein the strainer includes at least one housing with at least one apertured strainered wall through which water can be drawn from the outside through the apertures into the housing, and wherein water may be fed to an emergency cooling system via at least one conduit connected to the housing, the improvement comprising flexible shield means mounted between separate strainer walls or strainer wall surfaces, said shield means being positioned in a first position or condition when water is drawn through a first one of said separate strainer walls or surfaces in which first position said shield means is operable to interrupt a fluid connection with the other second strainer wall and said conduit, said shield means being capable of assuming a second position in which there is provided an open connection between said second strainer wall and said conduit when said first strainer wall is blocked by impurities sufficient to create a low-pressure zone between the first strainer wall and said shield means, said low-pressure zone being effective to effect said shield means between said first and second positions.

2. A strainer device according to claim 1, including two separate strainer housings connected to a common main suction conduit through a branch conduit and wherein said flexible shield means unit is arranged adjacent to a junction point between said main suction conduit and said branch conduits.

3. A strainer device according to claim 2, wherein said shield means is fixed to a surrounding housing or tube conduit along three of four edge portions, a fourth edge portion being freely flexible and having a length longer than the length of an imaginary straight line between the opposite clamped edge portions whereby said fourth free edge portion may be connected against an inside portion of one of the two opposite curved walls in said housing or said tube conduit.

4. A strainer device according to claim 1, wherein said shield means is made of a rubber material or plastic cloth.

5. A strainer device according to claim 3, wherein said device includes a spring means in the area of said fourth, flexible edge portion of said shield means said spring being biased to adopt a curved configuration.

6. A strainer device according to claim 5, wherein said spring is wave-formed to achieve a shortening thereof when bending between said two working positions.

* * * * *